United States Patent [19]
Baker

[11] Patent Number: 5,129,219
[45] Date of Patent: Jul. 14, 1992

[54] BASE CUTTER ASSEMBLY

[75] Inventor: Malcolm J. Baker, Bundaberg, Australia

[73] Assignee: Austoft Industries Limited, North Bundaberg, Australia

[21] Appl. No.: 728,122

[22] Filed: Jul. 10, 1991

[30] Foreign Application Priority Data

Jul. 10, 1990 [AU] Australia .................. PK1111

[51] Int. Cl.⁵ .................................. A01D 45/10
[52] U.S. Cl. .............................. 56/53; 56/255; 56/503
[58] Field of Search ............ 56/53, 255, 500, 503, 56/DIG. 19

[56] References Cited

U.S. PATENT DOCUMENTS

| | | | |
|---|---|---|---|
| Re. 25,991 | 3/1966 | Gorham | 56/503 |
| 2,067,104 | 1/1937 | Spell | 56/503 X |
| 3,443,369 | 5/1969 | Zweegers | 56/503 X |
| 4,459,796 | 7/1984 | Stokes | 56/503 X |

Primary Examiner—George A. Suchfield
Attorney, Agent, or Firm—Weil, Gotshal & Manges

[57] ABSTRACT

A base cutter assembly (16) of a sugarcane harvester (10) in which the accumulation of trash around the drive shaft (32) of the base cutter assembly (16) is prevented. The base cutter assembly (16) is provided with a shaped drive shaft (32) which causes the trash which in use is wrapped around the shaft, to migrate towards an intermediate portion (40) of the drive shaft (32); and a cleaning means (34) positioned adjacent the intermediate portion (40) and adapted to remove the trash which builds up at the intermediate portion (40). The cleaning means may be in the form of a rotatable wheel (42) which is angled with respect to the longitudinal axis of the drive shaft (32).

14 Claims, 3 Drawing Sheets

BASE CUTTER ASSEMBLY

FIELD OF THE INVENTION

The present invention relates to an improved sugarcane harvester base cutter assembly in which the accumulation of trash around the drive shaft of the base cutter assembly is prevented.

DESCRIPTION OF THE INVENTION

It is necessary, particularly for cane harvesters used in harvesting green cane, i.e. cane that has not been burned prior to harvesting, that the throat area through which the cut cane passes be as wide and unobstructed as possible. This is due to the large amount of crop material that must pass through the throat and be cut by the base cutter.

With cane harvesters of the prior art, during harvesting of green cane, cane trash (leaves, etc.) wraps around the drive shafts of the base cutters, one layer on top of another. If left uncleaned, there will be sufficient build up of trash to stop the harvesting operation. Accordingly, it would be advantageous if a base cutter assembly could be provided in which the accumulation of trash around the drive shafts of the base cutters is substantially prevented.

SUMMARY OF THE INVENTION

The present invention consists in an improved sugarcane harvester base cutter assembly comprising cutting means and a drive shaft, having a first and second ends, adapted to drive the cutting means, the improvement comprising the drive shaft being shaped such that trash wrapping around the drive shaft is urged to collect at a point on the drive shaft intermediate the first and second ends and cleaning means adapted to remove trash from the drive shaft, the cleaning means being positioned adjacent the point on the drive shaft.

In a preferred embodiment of the present invention the drive shaft has an hour-glass shape. This is preferably created by providing an array of triangular paddles spaced apart around the periphery of one end of the drive shaft and a truncated cone at the other end of the drive shaft such that the overall diameter of the drive shaft is smallest at a point intermediate the ends.

The cleaning means could comprise a stationary deflector plate mounted adjacent the point of minimum diameter of the drive shaft.

In a further preferred embodiment of the present invention, however, the cleaning means comprises a wheel. It is preferred that the wheel is positioned at an angle to the drive shaft such that the rotational axis of the wheel is neither parallel to the longitudinal axis of the drive shaft nor normal to it.

The wheel may be either free-wheeling or driven, however, it is presently preferred that the wheel is free-wheeling so that the need to provide means to drive the wheel is avoided. When the wheel is free-wheeling it gains its driving torque through friction from contact with the collected trash. The wheel acts as a deflector plate preventing trash from being wrapped around the drive shaft.

BRIEF DESCRIPTION OF THE DRAWINGS

In order that the nature of the present invention may be more clearly understood, a preferred form thereof will now be described with reference to the accompanying drawing in which.

PREFERRED EMBODIMENTS OF THE INVENTION

Figure 1:
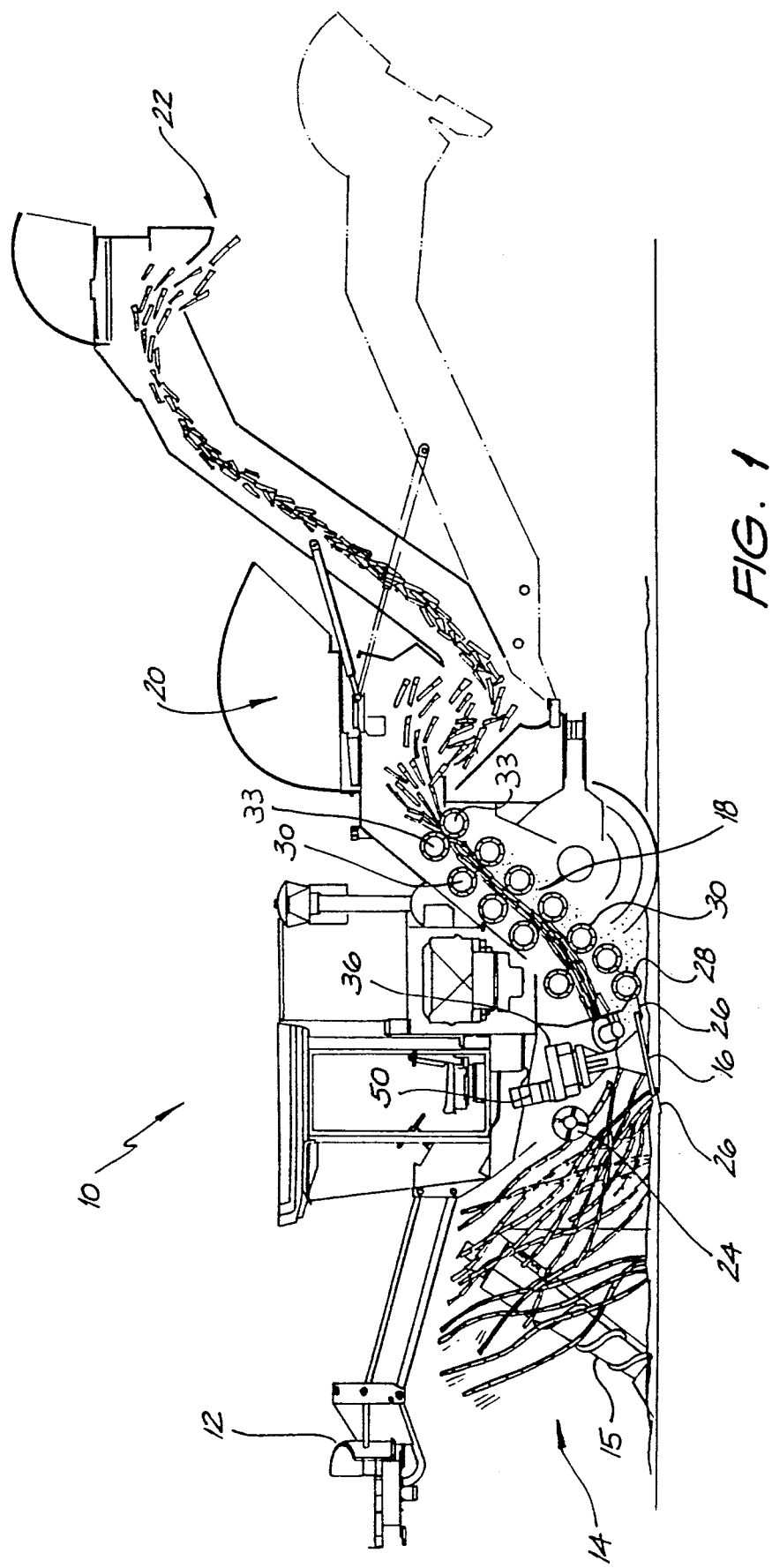
FIG. 1 is a side view of a cane harvester according to the invention.

A cane harvester is shown generally at 10 in FIG. 1. It compromises a topper assembly shown at 12, a crop gathering and dividing area generally shown at 14, crop divider rollers 15, a base cutter assembly generally shown at 16, a feeding area generally shown at 18, a cleaning area generally shown at 20 and an elevating and discharge area generally shown at 22.

The throat area of the harvester 10 includes a top roller 24 and the cutter blades 26 of the base cutter assembly 16. A butt roller 28 is mounted immediately behind the cutter blades 26. The feeding area includes feed rollers 30 which lead to the chopper drums 33.

Figure 2:
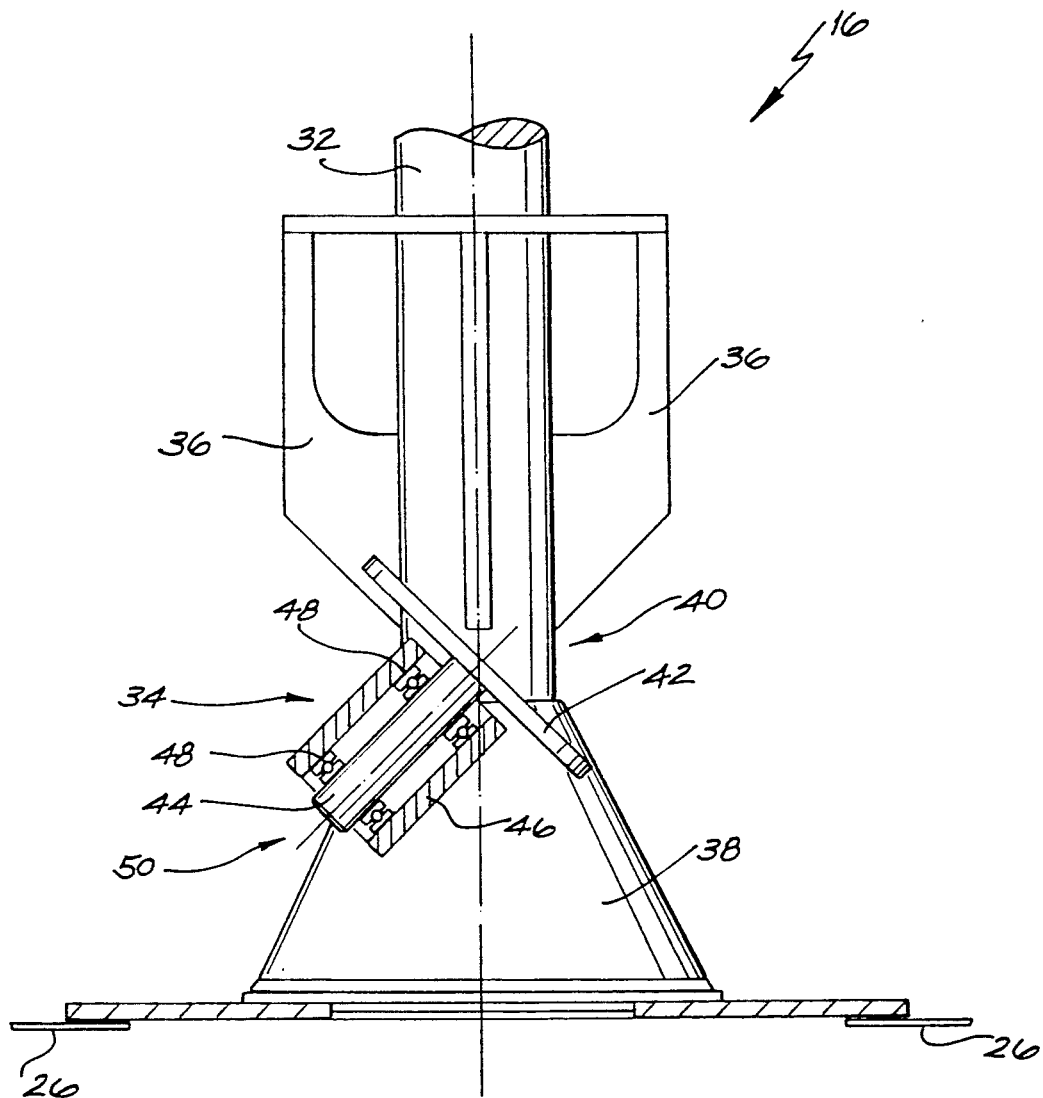
FIG. 2 is a rear view of the base cutter assembly of the present invention.
Figure 3:
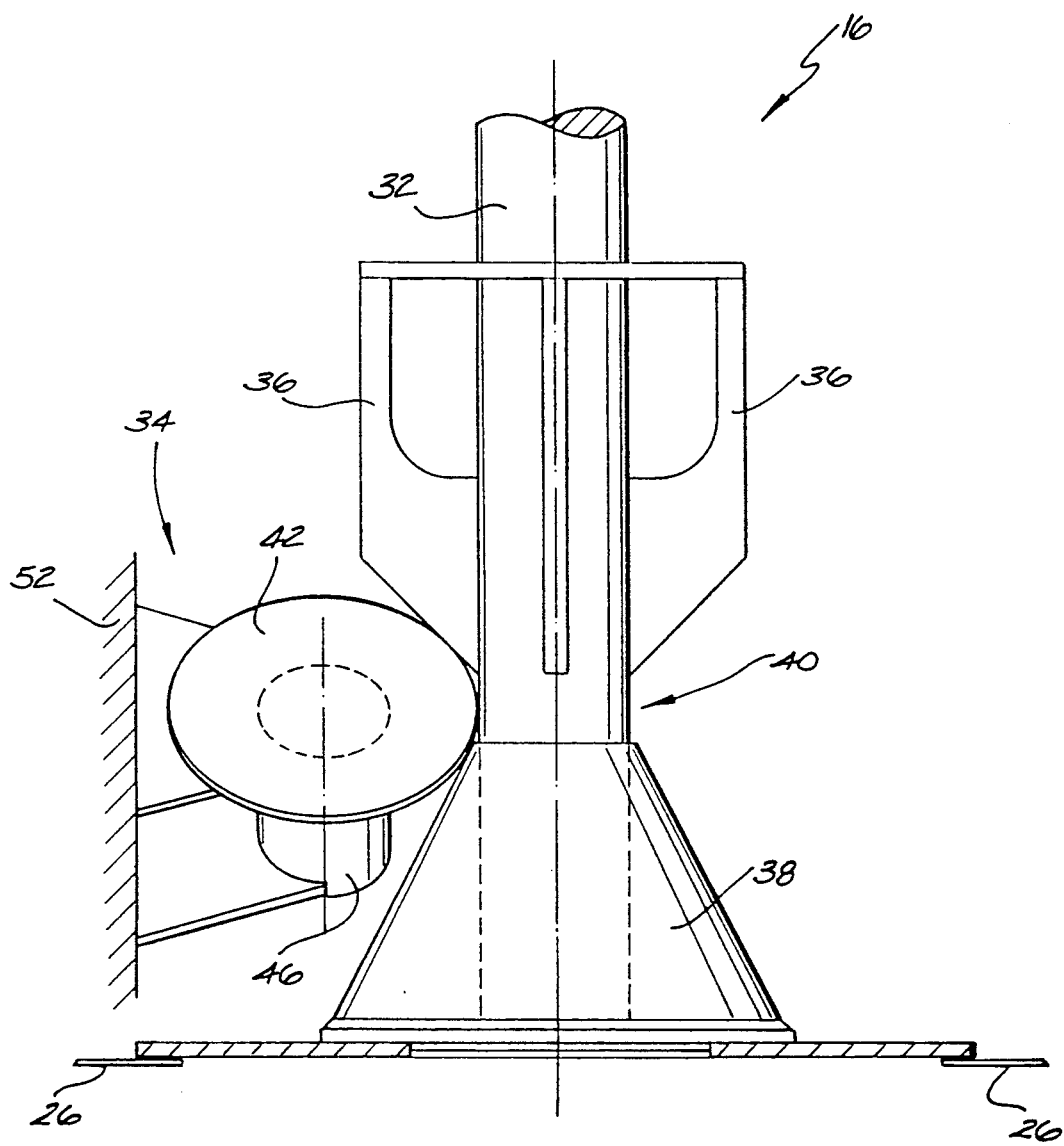
FIG. 3 is a side view of the base cutter assembly of the present invention.

As is more clearly shown in FIGS. 2 and 3 the base cutter assembly 16 includes a drive shaft 32, cleaning means 34 and cutter blades 26. The drive shaft 32 is provided with essentially triangular paddles 36 and cone 38 at each end so that the overall shape of the drive shaft is that of an hour-glass.

Positioned at the intermediate portion of neck 40 of this hour-glass shape is a cleaning means 34. Cleaning means 34 includes a wheel 42 mounted on shaft 44 which is supported in housing 46 by bearings 48. The wheel 42 may either be allowed to rotate freely, or may optionally be driven by a motor shown (not shown) which may be mounted to the housing 46 generally at 50.

As is most clearly shown in FIG. 3, the cleaning means 34 is mounted on frame 52 of the harvester 10. As is best shown in FIG. 2 the longitudinal axis of shaft 44 is at an angle of approximately 45° to the longitudinal axis of drive shaft 32, and as is best shown in FIG. 3 the shaft 44 extends generally tangentially to the drive shaft 32 at a predetermined radius which is slightly greater than the radius of the wheel 42.

During harvesting, drive shaft 32 is externally driven and trash tends to wrap around drive shaft 32. Due to the provision of paddles 36 and cone 38 on drive shaft 32, this material migrates to the intermediate or neck portion 40. The rotation of wheel 42, caused by either the action of motor 50 or by friction between the accumulated trash and the wheel 42, acts to peel the trash from the drive shaft 32, thereby preventing build up of trash on the drive shaft 32.

Preliminary trials were conducted in which the improved base cutter assembly of the present invention was mounted on one side of a sugarcane harvester, whilst a prior art base cutter assembly was mounted on the other side. In these trials the drive shaft of the improved base cutter assembly remained substantially free of trash accumulation whereas the drive shaft of the prior art base cutter assembly wrapped up with trash several times and required cleaning.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

I claim:

1. A base cutter assembly for a sugarcane harvester comprising:

a cutting means and an elongate drive shaft adapted to drive the cutting means; characterized in that the drive shaft is shaped such that, in use, trash wrapping around the drive shaft is urged to collect proximate an intermediate portion of the drive shaft;

and cleaning means positioned adjacent the intermediate portion of the drive shaft and adapted to remove the trash which is wrapped around the drive shaft.

2. The assembly of claim I wherein said drive shaft generally has the shape of an hour-glass with a reduced effective diameter portion defining said intermediate portion.

3. The assembly of claim 2 wherein the drive shaft has a straight shaft extending the length of the drive shaft from one end to an opposite end, a first shape means mounted proximate the one end of the straight shaft;

a second shape mean mounted proximate the opposite end of the straight shaft;

said first and second shape means having an outside surface or surfaces which converge towards the intermediate portion.

4. The assembly of claim 3 wherein the first and/or the second shape means is a conical member.

5. The assembly of claim 3 whereas the first and/or the second shape means includes one or more paddle members which are mounted so as to extend longitudinally of and radially outwards from the straight shaft so that an outside edge of the or each paddle converges towards the intermediate portion.

6. The assembly of claim 3 wherein said first shape means is a conical member and the second shape means includes one or more paddle members which are mounted so as to extend longitudinally of and radially outwards from the straight shaft so that an outside edge of the or each paddle converges towards the intermediate portion.

7. The assembly of claim I wherein the cleaning means includes a deflector plate having an edge immediately adjacent the intermediate portion.

8. The assembly of claim 7 wherein the deflector plate is a circular wheel rotatable about an axis normal to the plane of the plate.

9. The assembly of claim 8 wherein the wheel is positioned with respect to drive shaft such that the rotational axis of the wheel is neither parallel nor normal to the longitudinal axis of the drive shaft.

10. The assembly of claim 9 wherein the wheel is drivably rotatable by a drive means, or is freely rotatable.

11. The assembly of claim 10 wherein the axis of rotation of the wheel extends at an angle of approximately 45° with respect to the longitudinal axis of the drive shaft, and extends generally tangentially with respect to the drive shaft at a predetermined radius from the longitudinal axis of the drive shaft which is slightly greater than the combined radii of the wheel and the intermediate portion of the drive shaft.

12. The assembly of claim 9 wherein the axis of rotation of the wheel extends at an angle of approximately 45° with respect to the longitudinal axis of the drive shaft, and extends generally tangentially with respect to the drive shaft at a predetermined radius from the longitudinal axis of the drive shaft which is slightly greater than the combined radii of the wheel and the intermediate portion of the drive shaft.

13. The assembly of claim 8 wherein the wheel is drivably rotatable by a drive means, or is freely rotatable.

14. The assembly of claim 13 wherein the axis of rotation of the wheel extends at an angle of approximately 45° with respect to the longitudinal axis of the drive shaft, and extends generally tangentially with respect to the drive shaft at a predetermined radius from the longitudinal axis of the drive shaft which is slightly greater than the combined radii of the wheel and the intermediate portion of the drive shaft.

* * * * *